United States Patent [19]

Megahed

[11] 4,048,405
[45] Sept. 13, 1977

[54] HIGH DRAIN RATE, PRIMARY ALKALINE CELL HAVING A DIVALENT SILVER OXIDE/MONOVALENT SILVER OXIDE DEPOLARIZER BLEND COATED WITH A LAYER OF SILVER

[75] Inventor: El Sayed Megahed, Madison, Wis.

[73] Assignee: ESB Incorporated, Philadelphia, Pa.

[21] Appl. No.: 741,658

[22] Filed: Nov. 15, 1976

Related U.S. Application Data

[63] Continuation of Ser. No. 666,657, March 15, 1976, abandoned.

[51] Int. Cl.² .................. H01M 6/04; H01M 4/02
[52] U.S. Cl. .................... 429/206; 429/219; 29/623.1
[58] Field of Search ............ 429/219, 209, 206, 217; 252/182.1, 425.3; 29/623.5; 264/111, 109; 427/123, 125

[56] References Cited

U.S. PATENT DOCUMENTS

| | | | |
|---|---|---|---|
| 3,615,858 | 10/1971 | Soto-Krebs | 429/166 |
| 3,650,832 | 3/1972 | Tvarusko | 429/207 |
| 3,853,623 | 12/1974 | Davis | 429/144 |

Primary Examiner—Anthony Skapars
Attorney, Agent, or Firm—Gilbert W. Rudman; Anthony J. Rossi; Gary V. Pack

[57] ABSTRACT

A high drain rate, primary alkaline cell comprising a negative electrode, a divalent silver oxide (AgO)/monovalent silver oxide ($Ag_2O$) depolarizer blend, a separator between said negative electrode and depolarizer blend, and an alkaline electrolyte consisting essentially of potassium hydroxide. The surface of the depolarizer blend adjacent to the separator is coated with a layer of silver. The reduced surface layer of the depolarizer provides improved stability of the depolarizer blend in the alkaline electrolyte, and it provides the cell with a single voltage plateau during discharge. The cell is characterized by a maximum open circuit voltage of about 1.75 volts. The surface of the depolarizer blend can be reduced to form the silver layer either prior to being placed in the cell container or after the blend is consolidated in the container. The amount of divalent silver oxide present in the depolarizer blend is critical, and the blend may contain up to about 70% by weight of divalent silver oxide and still achieve a single voltage plateau during discharge. The cell has a high drain rate capability whereby it can be pulsed, said cell being capable of providing a flash amperage greater than an average of 0.20 amperes per square centimeter of cell cross-sectional area.

13 Claims, 1 Drawing Figure

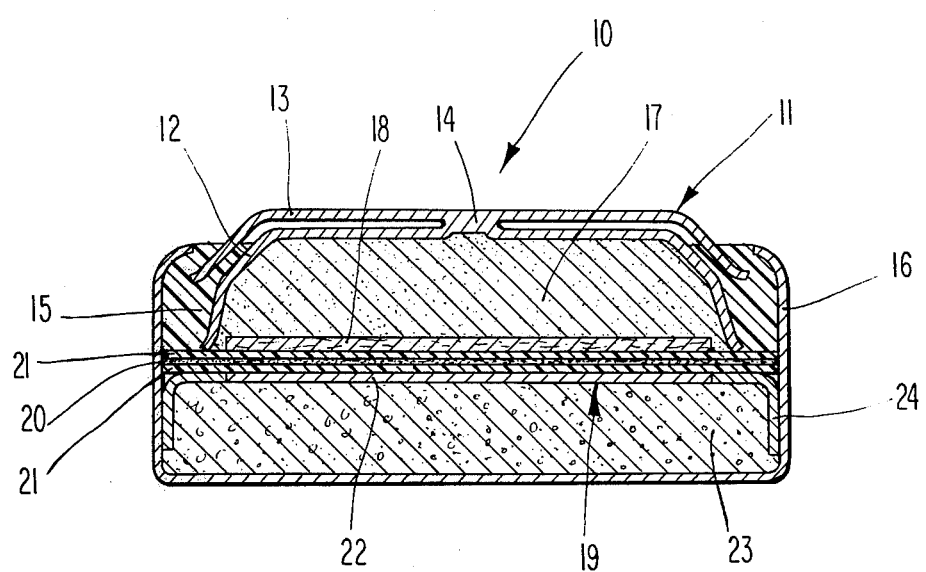

HIGH DRAIN RATE, PRIMARY ALKALINE CELL HAVING A DIVALENT SILVER OXIDE/MONOVALENT SILVER OXIDE DEPOLARIZER BLEND COATED WITH A LAYER OF SILVER

CROSS-REFERENCE TO RELATED APPLICATIONS

This application is a continuation of copending application Ser. No. 666,657, filed Mar. 15, 1976, now abandoned.

BACKGROUND OF THE INVENTION

In the packaged power industry, there is an ever increasing emphasis upon the development of high capacity, small volume electric cells. The following is a comparison of the capacity and voltage for some active materials currently used in commercially available cells:

| Active Material | EMF vs. Zn in Alkaline Electrolyte | Capacity ma-hr./g | Capacity amp-hr./cc |
|---|---|---|---|
| HgO | 1.35v. | 248 | 2.76 |
| $Ag_2O$ | 1.60v. | 232 | 1.67 |
| AgO | 1.82v. | 432 | 3.22 |

Divalent silver oxide (AgO) is an excellent high capacity battery active material, but it has two properties which have limited its use as a battery active material. During the discharge of a battery employing a divalent silver oxide positive active material, the initial voltage is at the higher divalent voltage level (1.82v. vs. Zn in alkaline electrolyte) until substantially all of the AgO is converted to $Ag_2O$, and thereafter, the discharge continues at the lower monovalent voltage level (1.60v. vs. Zn in alkaline electrolyte). This two plateau voltage level during discharge cannot be tolerated by many types of battery operated equipment.

Another problem encountered when using divalent silver oxide as a depolarizer (positive active material) is its lack of stability when in contact with aqueous alkaline solutions. It is well known that divalent silver oxide evolves oxygen when in contact with aqueous alkaline solutions, and this gassing phenomenon causes self-discharge of the divalent silver oxide, converting it to monovalent silver oxide or metallic silver. Divalent silver oxide cannot be used as the positive active material in hermetically sealed cells because of this instability in alkaline solutions and the consequent hazard of pressure build-up and possible cell rupture.

The problem of the two plateau voltage level during the electrical discharge of divalent silver oxide has previously been overcome by the inventions disclosed in U.S. Pat. Nos. 3,615,858 and 3,655,450 issued to Luis Soto-Krebs. These patents disclose a battery having a positive electrode comprising a principal active material (e.g., divalent silver oxide) and a secondary active material (e.g., monovalent silver oxide) whose discharge product is readily oxidized by the principal active material in the presence of alkaline electrolyte, and wherein the sole electronic path for discharge of the principal active material is through the secondary active material. The battery invented by Soto-Krebs is characterized throughout discharge by the potential of the secondary active material ($Ag_2O$) vs. the negative electrode in the alkaline electrolyte. The battery has the advantage of a single voltage level during electrical discharge and also the increased capacity provided by the divalent silver oxide positive active material.

The problem of the divalent silver oxide instability has been overcome by the inventions disclosed in U.S. Pat. Nos. 3,476,610 and 3,484,295 issued to Luis Soto-Krebs and Robert Dawson. These patents disclose a battery having a positive electrode comprising a principal active material (e.g., divalent silver oxide) and a secondary active material (e.g., monovalent silver oxide) employed as a substantially electrolyte-impermeable layer interposed between the principal active material and the battery components containing the electrolyte. This construction isolates the principal active material from contact with the electrolyte until the secondary active material is discharged, thereby providing improved stand or shelf life.

SUMMARY OF THE INVENTION

It is the general object of this invention to provide a high drain rate, primary alkaline cell having a divalent silver oxide/monovalent silver oxide depolarizer blend which is stable in the potassium hydroxide alkaline electrolyte and which cell is characterized by a single voltage plateau during discharge. Another object of the invention is to provide a high drain rate, primary alkaline cell, particularly of the "button cell" construction, which has increased capacity per unit weight and volume compared to a cell employing only monovalent silver oxide as the positive active material. A further object is to provide a high drain rate, primary alkaline cell having a positive electrode comprising a blend of divalent silver oxide and monovalent silver oxide which will utilize the capacity of both of these active materials and having a maximum open circuit voltage (vs. Zn in alkaline electrolyte) of about 1.75 volts. A still further object is to provide a novel method of manufacturing a divalent silver oxide-monovalent silver oxide depolarizer blend coated with a layer of silver.

It has been discovered that a high drain rate, primary alkaline cell having a divalent silver oxide/monovalent silver oxide depolarizer blend can be discharged at a single voltage plateau. Depolarizer blends containing up to about 70% by weight of divalent silver oxide have been used in high drain rate, primary alkaline cells having a zinc negative electrode and a potassium hydroxide electrolyte, and these cells have been discharged at a single voltage plateau with a maximum open circuit voltage of about 1.75 volts. Quite unexpectedly, it has been found that the depolarizer blend can be discharged at a single voltage plateau without restricting the electronic path to monovalent silver oxide, however, it is essential that the surface of the depolarizer blend adjacent to the separator is coated with a layer of silver. It is preferred that the layer of silver be substantially continuous and electrolyte permeable, and it may be formed by treating the surface of the depolarizer blend with a strong reducing agent such as hydrazine or formaldehyde. The surface of the depolarizer blend can be reduced either prior to being placed in the cell container, or preferably, after the blend is consolidated in the container. The layer of silver on the depolarizer blend is essential to achieve a single voltage plateau during discharge of the cell, and it also provides improved stability of the depolarizer blend in the potassium hydroxide electrolyte.

The high drain rate, primary alkaline cells of this invention are particularly useful as power sources for electronic watches, and they are manufactured in the "button cell" construction for use in small electric devices such as watches and hearing aids. The cells have the required single voltage plateau discharge characteristic and also stability of the depolarizer blend in potassium hydroxide electrolyte without incorporating special additives, such as those disclosed in U.S. Pat. No. 3,650,832. The primary alkaline cells have substantially increased electrochemical capacity over that supplied by cells using a monovalent silver oxide depolarizer. These cells also have improved high drain rate capability required for pulsing to activate a light emitting diode.

The above and other objects and advantages of this invention will be more fully described in the description of the preferred embodiment, particularly when read in conjunction with the accompanying drawing which forms a part of this specification.

BRIEF DESCRIPTION OF THE DRAWING

FIG. 1 is a cross-sectional view of the high drain rate, primary alkaline cell of this invention, in completely assembled condition.

DESCRIPTION OF THE PREFERRED EMBODIMENT

This invention comprises a high drain rate, primary alkaline cell having a divalent silver oxide (AgO)/monovalent silver oxide ($Ag_2O$) depolarizer blend (cathode) coated with a layer of silver, a negative electrode (anode), a separator between the depolarizer blend and the negative electrode, and an aqueous potassium hydroxide solution as the electrolyte. It is essential that the surface of the depolarizer blend adjacent to the separator be coated with a layer of silver which provides improved stability of the depolarizer blend in the potassium hydroxide electrolyte and provides the cell with a single voltage plateau during discharge. The silver layer may be formed by treating the surface of the depolarizer blend with a strong reducing agent, such as hydrazine, which provides a substantially continuous and electrolyte permeable silver layer. The maximum open circuit voltage of the cell is about 1.75 volts, and it is preferred that the open circuit voltage be approximately 1.6 volts which is characteristic of monovalent silver oxide. The open circuit voltage is measured by discharging the cell through a very high load, on the order of 1 to 100 megaohms. If a cell has an open circuit voltage of less than about 1.75 volts, it should provide a single voltage plateau during closed circuit discharge, even at low drains, for example discharges through loads of about 100,000 to about 500,000 ohms.

In addition to the silver layer on the depolarizer blend, the amount of divalent silver oxide present in the depolarizer blend is critical. It is preferred to have the maximum amount of divalent silver oxide and still achieve a single voltage plateau during discharge and a stable depolarizer blend. It has been determined that the amount of divalent silver oxide should not be greater than about 70% by weight of the silver oxide blend. In addition to the divalent and monovalent silver oxides, the depolarizer may also contain minor amounts of a lubricant and/or binder such as polytetrafluoroethylene or other suitable plastic binder. Ingredients may also be incorporated in the depolarizer for the purpose of providing voltage stability such as silver powder, and to insure the stability of the divalent silver oxide in the alkaline electrolyte, such as gold hydroxide as disclosed in U.S. Pat. No. 3,853,623.

The negative electrode may be zinc, cadmium, indium, magnesium, aluminum, titanium or manganese. It is preferred to use zinc active material which may be in the form of finely divided zinc particles, gelled or semi-gelled zinc particles, or a zinc foil. It is generally preferred that the zinc active material should be amalgamated regardless of the form which is used.

Between the depolarizer blend and the negative electrode, there is placed a separator which generally comprises both an absorbent component and a barrier material. The absorbent component may be made from a cellulosic material such as matted cotton fibers or from a non-cellulosic material such as microporous polyethylene. The absorbent material holds the electrolyte (generally in contact with the negative active material), and a plurality of layers may be used. The barrier material may also comprise one or more layers for preventing the passage of metallic ions or dendrite growth from one electrode to the other. The barrier material may be any suitable semi-permeable material such as cellophane, either alone or in combination with a synthetic barrier such as polyethylene grafted with methacrylic acid. It is preferred to use a laminated barrier material which comprises a layer of polyethylene grafted with methacrylic acid between layers of cellophane.

The cells of this invention utilize an alkaline electrolyte consisting essentially of an aqueous solution of potassium hydroxide. The electrolyte is preferably limited to an amount sufficient only to provide wetting of the cell components without establishing a liquid level of free electrolyte in the cell. The alkaline electrolyte preferably has a potassium hydroxide concentration of at least about 3% by weight ranging up to about 50% by weight. It may contain minor amounts of additives such as zinc oxide to inhibit dissolution of the zinc negative active material, and other alkali metal hydroxides, e.g., cesium, rubidium or sodium, may be substituted for minor portions of the potassium hydroxide.

A critical feature of this invention is the formation of the layer of silver on the surface of the depolarizer blend adjacent to the separator. A substantially continuous and electrolyte permeable layer of silver may be formed by treating the surface of the depolarizer blend with a strong reducing agent such as hydrazine or formaldehyde solutions. Other relatively strong reducing agents such as hydrogen, metals (zinc and iron), tin chloride, iron sulfate, sulfurous acid, oxalic acid, formic acid and hydroxylamine can also be used, provided that they are strong enough to reduce the depolarizer blend to silver within a reasonable time. When using hydrazine or formaldehyde, methanol solutions of the reducing agent are preferred and the surface of the depolarizer blend is treated for several minutes, generally from about 2–6 minutes is sufficient. A high proportion of AgO may require a longer reducing agent treatment. The treatment with the reducing agent is usually performed at room temperature, however, elevated temperatures may be used especially if it is desired to accelerate the reduction. Aqueous solutions of the reducing agent can be used as well as an organic solvent solution.

The depolarizer blend can be physically mixed, incorporating additives for special purposes, and then compressed into a pellet. The entire surface of the pellet can be reduced to silver by soaking the pellet or tumbling it in the reducing agent solution. This is not a preferred method, for it was found that pieces of the compressed depolarizer pellet broke off during the reduction treatment, and in some cases there was non-uniform pellet reduction. In addition to physical mixing, the depolarizer blend may be prepared by (1) oxidizing silver powder. (2) reducing a portion of a divalent silver oxide active material, or (3) reducing the AgO in situ by mixing it with a reducing metal such as zinc or cadmium.

The preferred method for manufacturing the depolarizer blend comprises (1) forming the depolarizer blend comprising divalent silver oxide and monovalent silver oxide, (2) compressing the blend in a press to form a pellet using a pressure ranging from about 40,000 to 60,000 psi, (3) placing the pellet in the cathode container, (4) consolidating the pellet in the container by compression using a consolidation pressure ranging from about 50,000 to 70,000 psi, and (5) treating the consolidated pellet/cathode container component with the reducing agent solution. In this preferred method, the bottom and sides of the depolarizer blend pellet remain non-reduced, however, treatment with the reducing agent may be carried out prior to consolidation. It is preferred to place a sleeve around the upper edge of the depolarizer blend, and this may be done prior to consolidating the pellet in the cathode container. The sleeve functions as a supporting surface to protect the depolarizer pellet during consolidation and when the cell is sealed by crimping the upper edge of the cathode container upon the grommet molded on the edge of the anode container.

One of the principal objectives of this invention is to increase the energy density per unit weight or volume of the depolarizer. Maximum energy density would be achieved by using only divalent silver oxide depolarizer material, but the resultant cell has two voltage plateaus during discharge and the divalent silver oxide is very unstable in the potassium hydroxide electrolyte. It has been found that the depolarizer blend can contain a maximum of about 70% by weight of divalent silver oxide and still provide a high drain rate alkaline cell having a single voltage plateau and a stable depolarizer. When mass producing the high drain rate, primary alkaline cells, it is generally preferred to use a depolarizer blend comprising at least about 50% divalent silver oxide in order to insure that the cell has a single voltage plateau, satisfactory elevated temperature stability, and improved electrochemical capacity.

Referring now to FIG. 1, a button cell construction 10 is illustrated, for the high drain rate, primary alkaline cells of this invention are particularly adapted for use in this construction, and button cells were used to evaluate the divalent silver oxide/monovalent silver oxide depolarizer blends. These button cells are of the type currently used as a power source for electronic watches, an application for which the high drain rate, primary alkaline cells having a divalent silver oxide/monovalent silver oxide depolarizer blend coated with a layer of silver are particularly effective.

The negative electrode (anode) container 11 comprises what is commonly referred to as a "double top." Two cans are placed in physical, electrical contact with each other, with the inner can 12 being nested in the outer can 13 to form a tight friction fit. It is generally preferred to spot weld the cans together as indicated at 14 to maintain permanent electrical contact. The cans may be made from nickel-plated steel which has good corrosion resistance, however, other materials may be used and the surfaces of the cans can be given special coatings. The double top anode container is preferred for its superior leakage prevention properties, however, a single top container can be used. A collar or grommet 15 of nylon or polyethylene is molded onto the edge of the anode container 11 to electrically insulate it from the depolarizer (cathode) container 16. The negative electrode or anode 17 is a zinc active material in the form of a gel or semi-gel comprising finely divided zinc particles, a small amount of gelling agent such as guar gum or carboxymethyl cellulose (e.g., 0.2% by weight) and a portion of the aqueous potassium hydroxide electrolyte solution.

The separator comprises an absorbent component 18 and a barrier material 19. It is preferred to use matted cotton fibers (commercially available under the trademark "Webril") as the absorbent component which also contains a portion of the alkaline electrolyte. The semipermeable barrier material comprises a layer 20 of polyethylene grafted with methacrylic acid (commerically available under the trademark "Permion") sandwiched between layers 21 of cellophane. The absorbent component 18 is placed in contact with the zinc active material, and the barrier material is in contact with the silver layer 22 on the surface of the depolarizer blend 23.

The depolarizer blend or cathode 23 comprises a mixture of divalent silver oxide (AgO) and monovalent silver oxide ($Ag_2O$) and additives for special effects. The depolarizer blend generally contains polytetrafluoroethylene as a binder and lubricant. The blend may also contain a minor amount of a gas suppressant such as gold hydroxide to insure the stability of the divalent silver oxide. The following is a preferred depolarizer blend composition:

| Ingredient | Amount (% by wt.) |
|---|---|
| Divalent Silver Oxide (AgO) | 50 |
| Monovalent Silver Oxide ($Ag_2O$) | 48.35 |
| Polytetrafluoroethylene (Teflon) | 1.5 |
| Gold Hydroxide | 0.15 |

The silver layer 22 is formed in situ on the depolarizer blend after it is consolidated in the cathode container 16 by immersing it in a 3% by weight hydrazine solution in methanol for about 5 minutes. When formed in this manner, the silver layer is substantially continuous and electrolyte permeable. A sleeve 24 is placed around the upper edge of the depolarizer blend, however, this is not an essential component of the button cell construction. If desired, the entire surface of the depolarizer blend 23 can be reduced by carrying out the reduction treatment prior to consolidation in container 16.

The high drain rate, primary alkaline cells of this invention are specially designed and constructed as power sources for electronic watches having a light emitting diode (LED) display. These watches require a battery which is capable of providing a high drain rate discharge in the form of pulses. It is essential in order to light the display for a reasonable number of pulses that the primary alkaline cells be capable of providing a flash current greater than an average of 0.2 amperes per square centimeter of cell cross-sectional area. In addition, the cell system much have improved stability in the presence of alkaline electrolyte, for the potassium hydroxide electrolyte required for the high drain rate capability accentuates the propensity of the divalent silver oxide to evolve gas in the presence of alkaline solutions. In some cases it may be necessary to precondition the cell before using it as a power source by short circuiting the cell for a few seconds. It has been discovered that this preconditioning increases the flash current of the cell and provides more uniform flash current performance.

the cells, the sleeve around the depolarizer pellet was silver-plated. The electrolyte was a 40% KOH + 1% ZnO aqueous solution. The following results were recorded:

| % AgO in Depolarizer | Silver Layer | Electrical Properties | | | Cell Expansion 7 days at 165° F (mils) |
|---|---|---|---|---|---|
| | | Impedance (ohms) | OCV (volts) | CCV (167ohms) (volts) | |
| 40 | No | 98.4 | 1.86 | 1.33 | 8.4 |
| 40 | Yes | 2.9 | 1.61 | 1.55 | 4.4 |
| 45 | No | 97.4 | 1.86 | 1.34 | 7.0 |
| 45 | Yes | 2.7 | 1.61 | 1.55 | 0.2 |
| 50 | No | 93.6 | 1.86 | 1.37 | 15.4 |
| 50 | Yes | 9.9 | 1.61 | 1.54 | 16.4 |
| 55 | No | 99.4 | 1.86 | 1.34 | 7.4 |
| 55 | Yes | 51.1 | 1.64 | 1.50 | 7.0 |
| 60 | No | 88.5 | 1.86 | 1.35 | 10.4 |
| 60 | Yes | 28.5 | 1.62 | 1.53 | 9.2 |

EXAMPLE 1

Primary alkaline button cells (RW 44 size having a cathode container diameter of 0.450 inches and a height ranging from about 0.150 to about 0.162 inches) having the construction illustrated in FIG. 1 were tested to determine the effect of a silver layer placed on the depolarizer blend surface for high rate cells (35% KOH + 1% ZnO aqueous electrolyte solution). In addition to the mixture of divalent and monovalent silver oxides, the depolarizer blend contained 1.5% by weight of polytetrafluoroethylene and 0.15% by weight of gold hydroxide. The depolarizer blend was immersed, after consolidation in the cathode container, in a 3% by weight hydrazine in methanol solution for 3 minutes to form the substantially continuous silver layer. The anode was a zinc blend comprising 99.8% by weight of amalgamated zinc particles (7% mercury) and 0.2% by weight of guar gum gelling agent. The closed circuit voltage (CCV) was measured through a 167 ohm load. The electrical properties and stability were recorded as the average for 30 cells. The flash current was measured by electrically connecting a cell to a standard ammeter (having an internal resistance of about 0.015 ohms) and determining the current flow at 0.5 seconds. The following results were recorded:

The electrical properties were recorded as the average for 30 cells. The superior performance and properties of the cells having the silver layer on the depolarizer blend is clearly demonstrated.

EXAMPLE 3

Primary alkaline button cells (RW 44 size) were treated with two different strong reducing agents to form a silver layer on the depolarizer blend, and voltage and cell stability were determined. The depolarizer blend comprised 50% by weight AgO mix, 49% by weight $Ag_2O$ and 1% by weight polytetrafluoroethylene. The AgO mix had the following composition:

| Ingredient | Amount (% by wt.) |
|---|---|
| AgO | 95.2 |
| Ag powder | 3.0 |
| Polytetrafluoroethylene (Teflon) | 1.5 |
| Au (OH)$_2$ | 0.3 |

All of the depolarizer blends were soaked for 1 minute in a 90/10 solution of 30% KOH/methanol, followed by rinsing and drying prior to the strong reducing agent treatment. All cells had a silver-plated sleeve around the depolarizer pellet.

| % AgO in Depolarizer | Electrolyte | Silver Layer | Electrical Properties | | | Flash Current (amps) | Cell Expansion 4 wks. at 165° F (mils) |
|---|---|---|---|---|---|---|---|
| | | | Impedance (ohms) | OCV (volts) | CCV (volts) | | |
| 40 | KOH | No | 34.4 | 1.85 | 1.28 | 0.15 | 21.2 |
| 40 | " | Yes | 3.4 | 1.60 | 1.55 | 0.69 | 12.5 |
| 30 | " | No | 35.7 | 1.85 | 1.15 | 0.13 | 20.7 |
| 30 | " | Yes | 3.0 | 1.60 | 1.55 | 0.71 | 8.6 |

The superior performance and properties of the cells having a silver layer on the depolarizer blend is clearly demonstrated.

EXAMPLE 2

Primary alkaline button cells (RW 44 size) having the construction illustrated in FIG. 1 were made to determine the effect of varying the AgO/Ag$_2$O ratio in combination with and without a hydrazine reduction treatment to form a silver layer on the depolarizer blend. The hydrazine treatment consisted of soaking the consolidated pellets in a solution of 1% by weight hydrazine in methanol, with stirring, for 3 minutes. In each of Lot A was treated in a solution of 1% by weight hydrazine in methanol for 3 minutes at room temperature. Lot B was treated in approximately 100 ml. of 30% KOH aqueous solution to which 2 ml. of 37% by weight formaldehyde in methanol was added. The solution containing the consolidated depolarizer blend was heated to 50° C. and the treatment was carried out for 15 minutes. Each lot comprised 40 cells with each cell having a zinc gel anode (99.8% by weight amalgamated zinc particles + 0.2% by weight guar gum) and a 40% KOH + 1% ZnO aqueous electrolyte solution. The following results were recorded:

| Lot No. | OCV | CCV (167 ohms) | Impedance (ohms) | Flash Current (amps) | Cell Expansion 1 wk at 165° F (mils) |
|---|---|---|---|---|---|
| A | 1.62v. | 1.55v. | 2.3 | 0.76 | 2.7 |
| B | 1.61v. | 1.57v. | 2.3 | 0.77 | 7.0 |

These results demonstrate that the formation of the silver layer on the depolarizer blend surface can be accomplished with any strong reducing agent capable of reducing AgO to Ag.

EXAMPLE 4

Primary alkaline cells (RW 44 size) having a construction similar to the cell illustrated in FIG. 1 were tested to determine the effect of using varied proportions of divalent silver oxide (AgO) in the depolarizer blend. All cells were made with a 40% potassium hydroxide aqueous solution containing 1% by weight zinc oxide. In addition to the silver oxides, the depolarizer blend contained about 1.5% by weight of polytetrafluoroethylene. The cells in Lots A-D were treated in a solution of 1% by weight hydrazine in methanol for 6 minutes at room temperature, and Lots E-I were treated in the hydrazine solution for 3 minutes. The electrical properties are reported as the average of 12 to 40 cells, with CCV measured through a 30 ohm load for Lots A-D and a 167 ohm load for Lots E-I, and the electrical data was recorded 1 day after closure for Lots A-D and 2 weeks after closure for Lots E-I. The cell expansion data was the average of four to six cells. The following results were recorded:

| Lot No. | % AgO | % Ag$_2$O | Impedance (ohms) | OCV (volts) | CCV (30 ohms) | Flash Current (amps) | Cell Expansion 1 wk at 160° F. (mils) |
|---|---|---|---|---|---|---|---|
| A | 10 | 88.5 | 2.7 | 1.59 | 1.43 | 0.53 | 0 |
| B | 20 | 78.5 | 2.5 | 1.59 | 1.44 | 0.57 | 0 |
| C | 30 | 68.5 | 2.6 | 1.60 | 1.44 | 0.67 | 0 |
| D | 40 | 58.5 | 2.4 | 1.60 | 1.45 | 0.72 | 0 |
|   |    |      |     |      | CCV (167 ohms) |      |   |
| E | 50 | 48.5 | 15.7 | 1.60 | 1.48 | 0.49 | 4 |
| F | 60 | 38.5 | 77.3 | 1.58 | 1.49 | 0.58 | 7 |
| G | 70 | 28.5 | 26.0 | 1.75 | 1.47 | 0.53 | 8 |
| H | 80 | 18.5 | 30.0 | 1.83 | 1.46 | 0.55 | 12 |
| I | 90 | 8.5  | 26.5 | 1.85 | 1.38 | 0.44 | 9 |

These results indicate that open circuit voltage and gassing stability (cell expansion) were no problem until the depolarizer blend contained at least about 50% AgO, and the cells with depolarizer blends containing at least about 80% AgO had open circuit voltages which were too high and had increased cell expansion.

Having completely described my invention, I claim:

1. A high drain rate, primary alkaline cell comprising a negative electrode, a divalent silver oxide/monovalent silver oxide depolarizer blend, a separator between said negative electrode and the depolarizer blend, and an aqueous potassium hydroxide electrolyte, said depolarizer blend containing up to about 70% by weight of divalent silver oxide, and a substantially continuous and electrolyte permeable layer of silver on the surface of the depolarizer blend adjacent to the separator, whereby the cell is characterized by the stability of the depolarizer blend in the potassium hydroxide electrolyte, a maximum open circuit voltage of about 1.75 volts, a single voltage plateau during discharge and is capable of providing a flash current greater than an average of 0.2 amps per square centimeter of cell cross-sectional area.

2. A primary alkaline cell in accordance with claim 1 in which the silver layer on the depolarizer blend is formed by treating the surface of the depolarizer blend with a strong reducing agent capable of reducing the divalent and monovalent silver oxides to metallic silver.

3. A primary alkaline cell in accordance with claim 2 in which the reducing agent is hydrazine.

4. A primary alkaline cell in accordance with claim 2 in which the divalent silver oxide is present in the depolarizer blend in an amount ranging from about 40 to about 60% by weight of the silver oxide portion of the depolarizer blend.

5. A primary alkaline cell in accordance with claim 1 in which only the surface of the depolarizer blend adjacent to the separator is coated with a substantially continuous and electrolyte permeable layer of silver.

6. A primary alkaline cell in accordance with claim 1 in which the concentration of the aqueous potassium hydroxide electrolyte ranges from at least about 3% by weight up to about 50% by weight of potassium hydroxide.

7. A method for manufacturing the depolarizer blend used in the primary alkaline cell of claim 1 which comprises (1) forming the depolarizer blend comprising divalent silver oxide and monovalent silver oxide, (2) compressing the blend to form a pellet, (3) placing the pellet in a cathode container, (4) consolidating the pellet in the container by compression, and (5) treating the consolidated pellet/cathode container component with a strong reducing agent for a period of time sufficient to reduce the surface of the depolarizer blend to metallic silver.

8. The method of claim 7 in which the strong reducing agent comprises hydrazine.

9. The method of claim 8 in which the hydrazine is present in a methanol solution in an amount ranging from about 1 to about 5% by weight, and the treatment of the consolidated pellet/cathode container with the hydrazine in methanol solution has a duration of from about 2 minutes to about 6 minutes.

10. The method of claim 7 in which the depolarizer blend ingredients which are mixed in step (1) include a minor amount of polytetrafluoroethylene.

11. The method of claim 7 in which a sleeve is placed around the upper edge of the depolarizer blend prior to consolidating the pellet in step (4).

12. A method for manufacturing the depolarizer blend used in the primary alkaline cell of claim 1 which comprises (1) forming the depolarizer blend comprising divalent silver oxide and monovalent silver oxide, (2) compressing the blend to form a pellet, (3) treating the pellet with a strong reducing agent for a period of time sufficient to reduce the surface of the depolarizer blend to metallic silver, (4) placing the pellet with the reduced surface in a cathode container, and (5) consolidating the pellet with the reduced surface in the cathode container by compression.

13. The method of claim 12 in which the strong reducing agent comprises hydrazine.

* * * * *